(12) United States Patent
Ko

(10) Patent No.: US 12,682,602 B2
(45) Date of Patent: Jul. 14, 2026

(54) METHOD, APPARATUS, WEARABLE HELMET, IMAGE CAPTURING APPARATUS AND PROGRAM FOR MEASURING DISTANCE BASED ON IMAGE

(71) Applicant: THINKWARE CORPORATION, Seongnam-si (KR)

(72) Inventor: Suk Pil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 380 days.

(21) Appl. No.: 18/216,216

(22) Filed: Jun. 29, 2023

(65) Prior Publication Data

US 2024/0005631 A1 Jan. 4, 2024

(30) Foreign Application Priority Data

Jul. 4, 2022 (KR) ........................ 10-2022-0082128

(51) Int. Cl.
| | |
|---|---|
| *G06V 10/74* | (2022.01) |
| *G06T 3/60* | (2024.01) |
| *G06T 7/62* | (2017.01) |
| *G06T 7/70* | (2017.01) |
| *G06V 10/25* | (2022.01) |

(52) U.S. Cl.
CPC .............. *G06V 10/761* (2022.01); *G06T 3/60* (2013.01); *G06T 7/62* (2017.01); *G06T 7/70* (2017.01); *G06V 10/25* (2022.01); *G06T*

*2207/20084* (2013.01); *G06T 2207/30252* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 10,698,222 B1 * | 6/2020 | Kim ...................... | G01S 13/931 |
| 2019/0098953 A1 * | 4/2019 | Strickland .............. | G06V 20/58 |

FOREIGN PATENT DOCUMENTS

| | | | | |
|---|---|---|---|---|
| WO | WO-2020090320 A1 * | 5/2020 | .............. | G06T 7/00 |
| WO | WO-2021185812 A1 * | 9/2021 | ........... | G06V 40/103 |

* cited by examiner

*Primary Examiner* — Andrew M Moyer
*Assistant Examiner* — Caroline E. Depalma
(74) *Attorney, Agent, or Firm* — WHDA, LLP

(57) ABSTRACT

There is provided a method for measuring a distance using a processor. The method for measuring a distance using a processor includes acquiring a driving image of a moving object, acquiring tilt information according to driving of the moving object, correcting the driving image by using the tilt information to calculate a distance between a target object included in the driving image and the moving object, and calculating a distance between the moving object and the target object based on the corrected driving image.

19 Claims, 14 Drawing Sheets

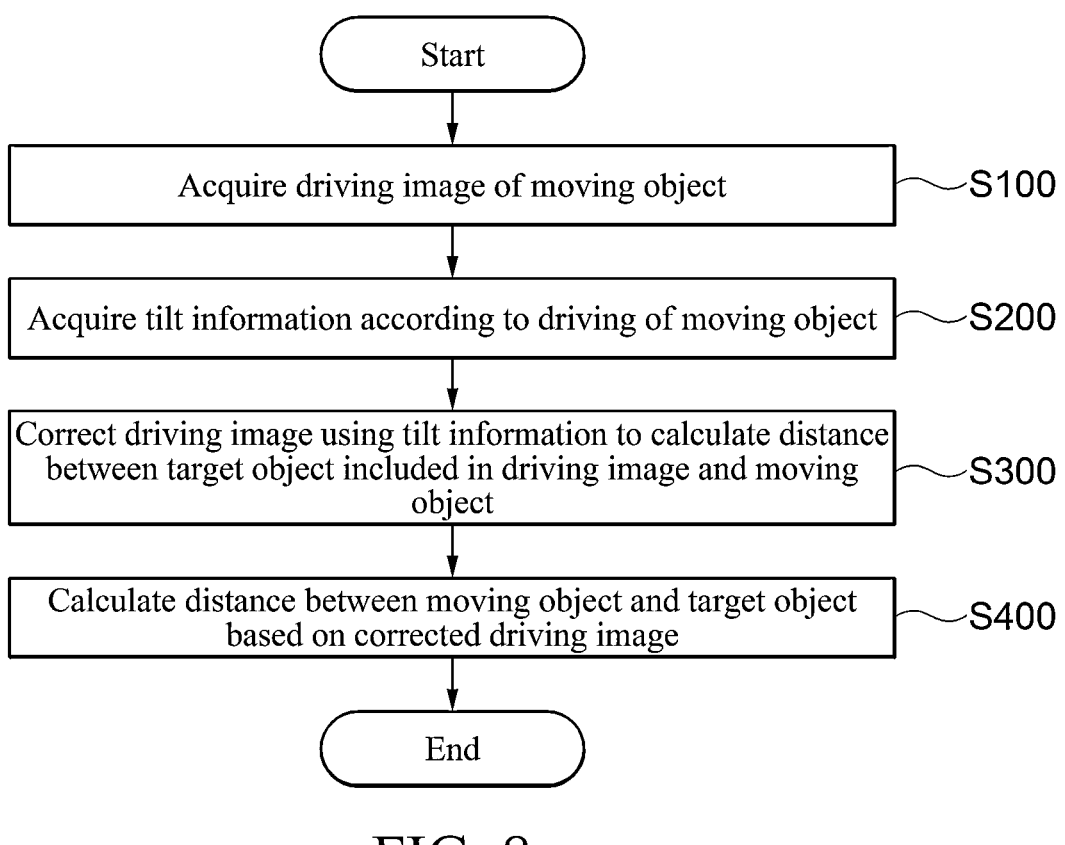

```
         ┌─────────┐
         │  Start  │
         └─────────┘
              │
              ▼
┌─────────────────────────────────────┐
│  Acquire driving image of moving object  │ ──── S100
└─────────────────────────────────────┘
              │
              ▼
┌─────────────────────────────────────────┐
│ Acquire tilt information according to driving of moving object │ ──── S200
└─────────────────────────────────────────┘
              │
              ▼
┌─────────────────────────────────────────────┐
│ Correct driving image using tilt information to calculate distance │
│ between target object included in driving image and moving │ ──── S300
│ object │
└─────────────────────────────────────────────┘
              │
              ▼
┌─────────────────────────────────────────┐
│ Calculate distance between moving object and target object │ ──── S400
│ based on corrected driving image │
└─────────────────────────────────────────┘
              │
              ▼
         ┌─────────┐
         │   End   │
         └─────────┘
```

FIG. 8

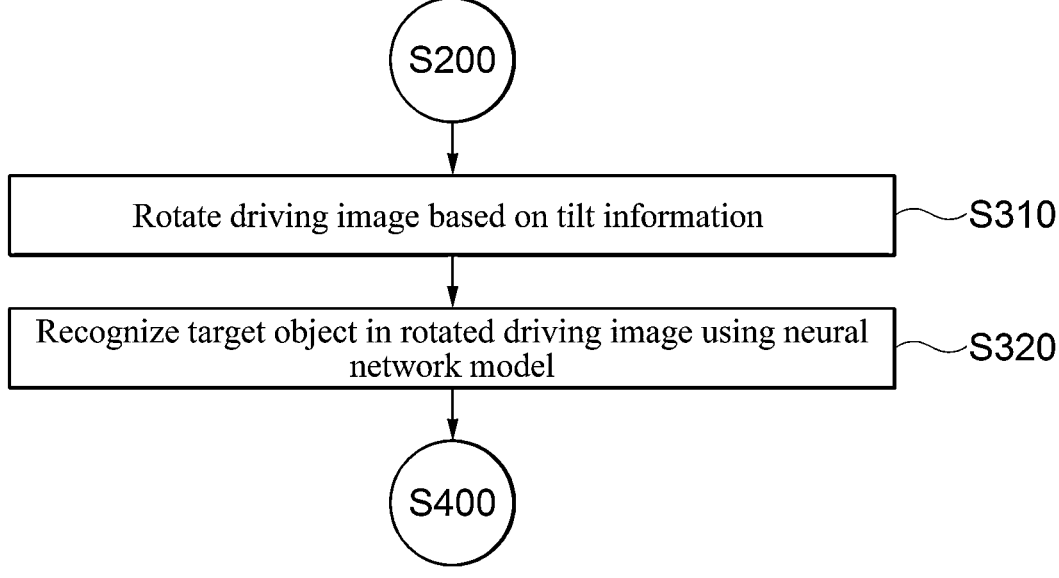

```
         ( S200 )
              │
              ▼
┌─────────────────────────────────────┐
│ Rotate driving image based on tilt information │ ──── S310
└─────────────────────────────────────┘
              │
              ▼
┌─────────────────────────────────────────┐
│ Recognize target object in rotated driving image using neural │ ──── S320
│ network model │
└─────────────────────────────────────────┘
              │
              ▼
         ( S400 )
```

METHOD, APPARATUS, WEARABLE HELMET, IMAGE CAPTURING APPARATUS AND PROGRAM FOR MEASURING DISTANCE BASED ON IMAGE

CROSS-REFERENCE TO RELATED APPLICATION

This application claims the priority and benefit of Korean Patent Application No. 10-2022-0082128 filed on Jul. 4, 2022, with the Korean Intellectual Property Office, the disclosure of which is incorporated herein by reference.

BACKGROUND OF THE INVENTION

1. Field of the Invention

The present invention relates to a technique for measuring a distance between a moving object and a target object using an image.

2. Description of the Related Art

Personal mobility (PM), such as electric kickboards, electric bicycles, Ninebot-electric wheels, and electric motorcycles, which are not only eco-friendly compared to automobiles but also have strengths in parking and medium-distance driving, have come into prominence as future means of transportation.

Also, in recent years, as personal mobility sharing services and the like have been activated, the number of users using personal mobility on roads or sidewalks has increased.

In line with the increase in the usage rate of personal mobility, the problem of personal mobility safety has emerged, and as a solution, the application of advanced driver assistance systems (ADAS), which have been used in conventional automobiles, to personal mobility has been discussed.

However, unlike automobiles, personal mobility, such as motorcycles and kickboards, makes a large rotation in a roll direction that tilts to the left or right, so an image-based distance measurement method applied to conventional automobiles results in too significant an error to apply to personal mobility.

SUMMARY

An aspect of the present invention may provide a distance measurement method, a distance measurement apparatus, and a distance measurement computer program for correcting a driving image used for a distance measurement based on tilt information according to driving of a moving object and calculating a distance between the moving object and a target object based on the corrected driving image.

Another aspect of the present invention may provide a wearable helmet for a personal mobility driver performing the distance measurement function described above.

Another aspect of the present invention may provide an image capturing apparatus installed in a personal mobility that performs the distance measurement function described above.

According to an aspect of the present invention, a method for measuring a distance using a processor includes: acquiring a driving image of a moving object; acquiring tilt information according to driving of the moving object; correcting the driving image by using the tilt information to calculate a distance between a target object included in the driving image and the moving object; and calculating a distance between the moving object and the target object based on the corrected driving image.

The tilt information may be calculated based on a rotation value of a 3-axis sensor in a roll direction.

The 3-axis sensor may be provided in an image capturing apparatus for capturing the driving image of the moving object.

The image capturing apparatus may include: a first image capturing apparatus capturing an image of a front of the moving object; and at least one second image capturing apparatus capturing an image other than the front.

The method may further include: recognizing a target object in the driving image using a neural network model, wherein the neural network model is a model trained to recognize an object in the driving image and output a bounding box representing an object region in the driving image.

The correcting may include rotating the driving image based on the tilt information, and the recognizing may include recognizing a target object based on the rotated driving image.

The correcting may include rotating a bounding box of a target object recognized from the driving image based on the tilt information.

The calculating of the distance may include calculating the distance between the target object and the moving object by at least one of a first calculation method using size information of the target object and a second calculation method using position information of the target object.

The calculating of the distance may use at least one of size information and position information of a bounding box of the target object recognized from the driving image.

According to another aspect of the present invention, an apparatus for measuring a distance includes: a driving image acquiring unit acquiring a driving image of a moving object; a tilt information acquiring unit acquiring tilt information according to driving of the moving object; a correcting unit correcting the driving image by using the tilt information to calculate a distance between a target object included in the driving image and the moving object; and a distance calculating unit calculating the distance between the moving object and the target object based on a corrected driving image.

The tilt information may be calculated based on a rotation value of a 3-axis sensor in a roll direction.

The 3-axis sensor may be provided in an image capturing apparatus capturing a driving image of the moving object.

The image capturing apparatus may include: a first image capturing apparatus capturing an image of a front of the moving object; and at least one second image capturing apparatus capturing an image other than the front.

The apparatus may further include: a target object recognizing unit recognizing a target object in the driving image using a neural network model, wherein the neural network model is a model trained to recognize an object in the driving image and output a bounding box representing an object region in the driving image.

The correcting unit may rotate the driving image based on the tilt information, and the target object recognizing unit may recognize the target object based on the rotated driving image.

The correcting unit may rotate the bounding box of the target object recognized in the driving image based on the tilt information.

The distance calculating unit may calculate the distance between the target object and the moving object by at least one of a first calculation method using size information of the target object and a second calculation method using position information of the target object.

The distance calculating unit may use at least one of size information and position information of the bounding box of the target object recognized from the driving image.

According to another aspect of the present invention, a wearable helmet for a personal mobility driver may include: an output unit outputting guidance information that can be checked by a driver; a driving image acquiring unit acquiring a driving image of a moving object; a tilt information acquiring unit acquiring tilt information according to driving of the moving object; a correcting unit correcting the driving image by using the tilt information to calculate a distance between a target object included in the driving image and the moving object; and a distance calculating unit calculating a distance between the moving object and the target object based on the corrected driving image.

The apparatus may further include: a controller controlling the output unit to display a calculated distance.

According to another aspect of the present invention, an image capturing apparatus installed in a personal mobility includes: an image capturing unit capturing a driving image of a moving object; a tilt information acquiring unit acquiring tilt information according to driving of the moving object; a correcting unit correcting the driving image by using the tilt information to calculate a distance between a target object included in the driving image and the moving object; and a distance calculating unit calculating a distance between the moving object and the target object based on the corrected driving image.

The image capturing apparatus may further include: a communication unit transmitting data on the distance between the moving object and the target object to a wearable helmet for a driver of the personal mobility.

According to various exemplary embodiments of the present invention described above, a distance between a moving object and a target object may be accurately measured using a driving image captured in a driving environment of the moving object in which a significant rotation in a roll direction occurs.

BRIEF DESCRIPTION OF DRAWINGS

FIGS. 7 to 9 are flowcharts illustrating a distance measurement method according to an exemplary embodiment of the present invention.

FIGS. 13 and 14 are block diagrams illustrating an autonomous moving object according to an exemplary embodiment of the present invention.

DETAILED DESCRIPTION

The following description illustrates only a principle of the present invention. Therefore, those skilled in the art may invent various devices that implement the principle of the present invention and are included in the spirit and scope of the present invention although not clearly described or shown in the present specification. In addition, it is to be understood that all conditional terms and exemplary embodiments listed in the present specification are obviously intended only to allow those skilled in the art to understand a concept of the present invention in principle, and the present invention is not limited to the exemplary embodiments and states particularly listed as described above.

The above-mentioned objects, features, and advantages will become more obvious from the following detailed description provided in relation to the accompanying drawings. Therefore, those skilled in the art to which the present invention pertains may easily practice a technical idea of the present invention.

Further, in describing the present invention, in the case in which it is determined that a detailed description of a known technology associated with the present invention may unnecessarily make the gist of the present invention unclear, it will be omitted. Hereinafter, exemplary embodiments of the present invention will be described in detail with reference to the accompanying drawings.

Figure 1:
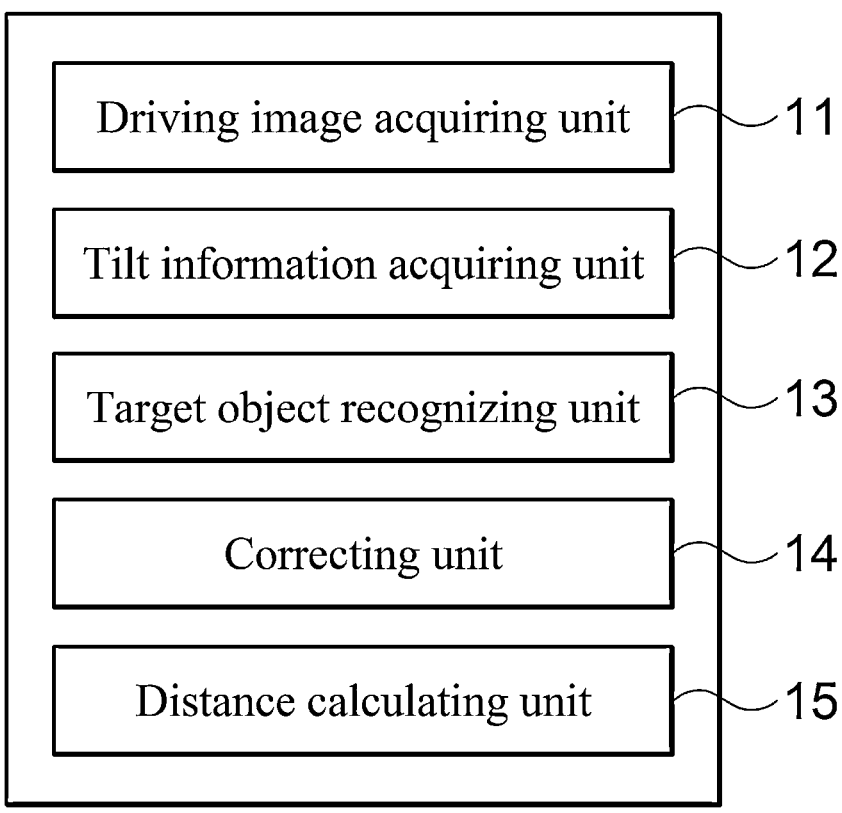
FIG. 1 is a block diagram illustrating a distance measurement apparatus according to an exemplary embodiment of the present invention.

FIG. 1 is a block diagram illustrating a distance measurement apparatus according to an exemplary embodiment of the present invention.

Referring to FIG. 1, a distance measurement apparatus 10 may include some or all of a driving image acquiring unit 11, a tilt information acquiring unit 12, a target object recognizing unit 13, a correcting unit 14, and a distance calculating unit 15.

Here, the distance measurement apparatus 10 may measure a distance between a moving object that is a reference of a distance measurement and a target object that is a target of a distance measurement.

The moving object, which is a movable dynamic object, may be a vehicle, a motorcycle, a pedestrian, a kickboard, bicycles, personal mobility, and the like.

In addition, the target object may include not only the dynamic object described above, but also static objects, such as electric poles, trees, and signboards fixedly installed in a driving environment.

The image acquiring unit 11 may acquire a driving image captured by an image capturing apparatus of the moving object or a separate image capturing apparatus. For example, the image acquiring unit 11 may acquire a driving image captured by the image capturing apparatus installed in the moving object in real time while the moving object is driving. As another example, the image acquiring unit 11 may acquire a driving image captured by an image capturing apparatus (e.g., an image capturing apparatus installed on a wearer's helmet or an image capturing apparatus held by the wearer's hand) of a user of the moving object in real time, while the moving object is driving.

Here, the image capturing apparatus described above may include a first image capturing apparatus capturing a driving image in front of the moving object and at least one second image capturing apparatus capturing a driving image other than the front of the moving object.

Accordingly, the image acquiring unit 11 may acquire the driving image in front of the moving object and the driving image other than the front of the moving object.

In addition, the driving image acquired by the image acquiring unit 11 may include a dynamic object, such as a pedestrian, motorcycles, and a vehicle, and static objects, such as a fixedly installed structure.

The tilt information acquiring unit 12 may acquire tilt information according to driving of the moving object from a sensor. Here, the sensor may be implemented as a 3-axis sensor, for example, an acceleration sensor, a gyro sensor, and an angular velocity sensor. Also, the sensor may be provided in an image capturing apparatus capturing the driving image of the moving object.

This 3-axis sensor may detect a rotation value in a roll direction, a rotation value in a pitch direction, and a rotation value in a yaw direction.

In this case, the tilt information acquiring unit 12 may acquire tilt information in the roll direction based on the rotation value of the 3-axis sensor in the roll direction.

That is, when the moving object tilts to the left or right, while driving, the image capturing apparatus installed in the moving object may also rotate in a left roll direction or a right roll direction, and accordingly, a driving image rotated in the roll direction may be acquired. Performing a distance measurement with the target object based on this image may cause a large error, and thus, in order to solve this problem, the distance measurement apparatus 10 according to the present invention may use the tilt information in the roll direction as a correction value for correcting the driving image.

The target object recognizing unit 13 may recognize a target object of a distance measurement, among various objects included in the driving image by using the trained neural network model.

Specifically, the target object recognizing unit 13 may input the driving image acquired by the image acquiring unit 11 to the neural network model in units of frames, and acquire a driving image including a bounding box representing a region of the target object in the driving image and type information of the target object corresponding to the bounding box. Here, the neural network model is, for example, an object recognition model based on a CNN network, for which a single shot multibox detector (SSD) algorithm may be used. This will be described with reference to FIGS. 2 and 3.

Figure 2:
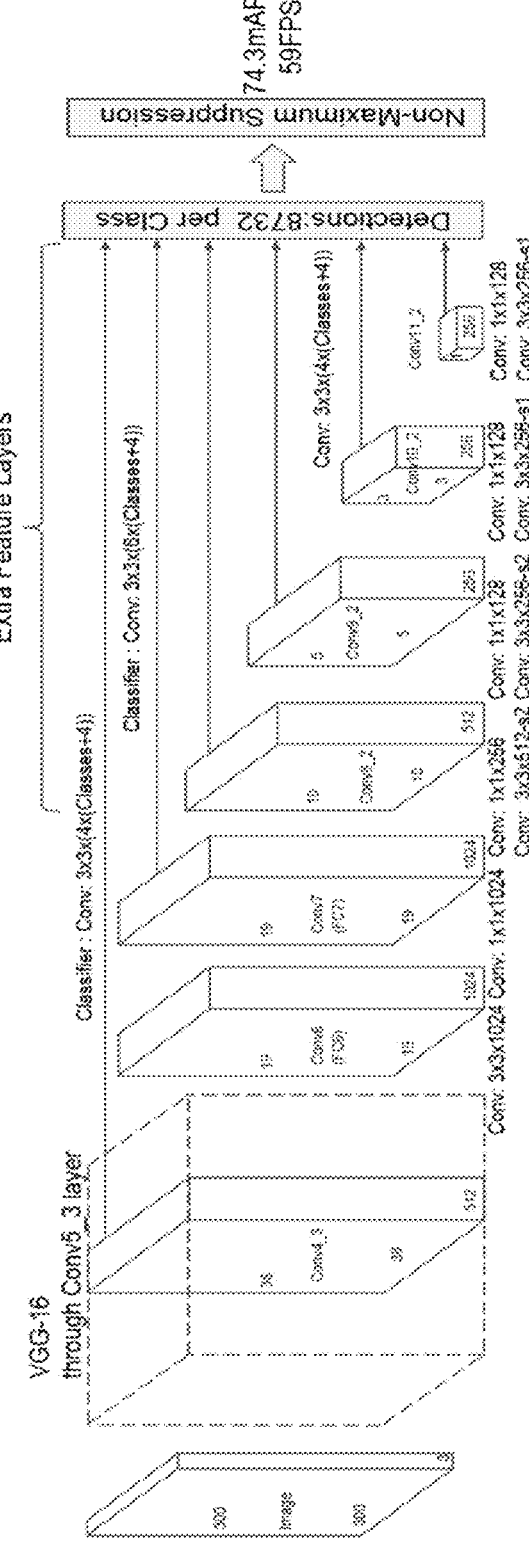
FIG. 2 is a diagram illustrating a structure of a neural network model according to an exemplary embodiment of the present invention.

FIG. 2 is a diagram illustrating a structure of a neural network model according to an exemplary embodiment of the present invention. Referring to FIG. 2, the neural network model may extract a base feature by passing the input driving image up to conv5_3 of a previously trained VGG-16 model, perform a convolution operation on an extracted feature map, transfer the convolution operation to a next layer, and perform the convolution operation up to a 1×1 size feature map. In addition, the neural network model may perform object detection on the feature map using a detector and classifier, and output a feature map including bounding box coordinate information corresponding to a target object in each feature map and type information classifying the target objects.

Thereafter, the neural network model may finally output a driving image including a single detection result by applying a non-maximum suppression (MNS) to the feature maps.

Figure 3A:
FIGS. 3A and 3B are diagrams illustrating recognizing a target object in a driving image using a neural network model according to an exemplary embodiment of the present invention.
Figure 3B:
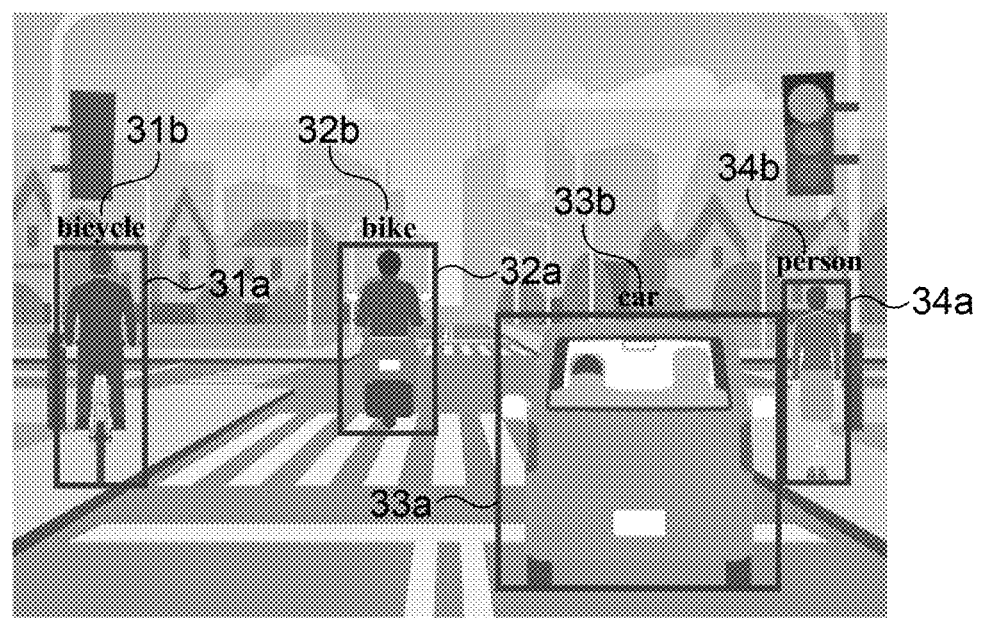

FIGS. 3A and 3B are diagrams illustrating recognizing a target object in a driving image using a neural network model according to an exemplary embodiment of the present invention. Referring to FIGS. 3A and 3B, when one frame of a driving image as shown in FIG. 3A is input to a neural network, the neural network may output a driving image including bounding boxes 31a, 32a, 33a, and 34a respectively corresponding to target objects included in the driving image and pieces of type information 31b, 32b, 33b, and 34b classifying the target objects as shown in FIG. 3B. Here, each bounding box may include coordinate information of each bounding box.

That is, the neural network model may recognize the target objects in the driving image and outputs the bounding box indicating a region of the target object in the driving image and a classification result for each target object type corresponding to the bounding box.

Meanwhile, the bounding box of FIGS. 3A and 3B and the type information of the target object corresponding to the bounding box are only examples and may be expressed to be different as necessary.

In addition, the aforementioned neural network model may be an example, and various algorithms, such as Refine-Det and YOLO, may be used in addition to the SSD algorithm.

Returning back to FIG. 1, the correcting unit 14 may correct the driving image acquired by the image acquiring unit 11 using the tilt information acquired by the tilt information acquiring unit 12 to calculate a distance between the target object included in the driving image and the moving object.

For example, the correcting unit 14 may correct the driving image by rotating the driving image acquired by the image acquiring unit 11 based on the tilt information acquired by the tilt information acquiring unit 12. This will be described in more detail with reference to FIGS. 4A, 4B, and 4C.

Figure 4A:
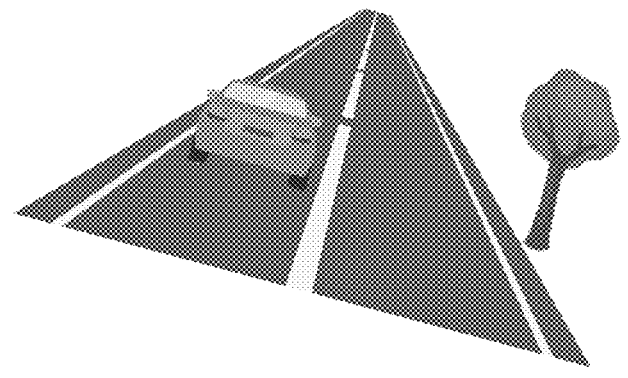
FIGS. 4A, 4B, and 4C are diagrams illustrating a method of correcting a driving image according to an exemplary embodiment of the present invention.
Figure 4B:
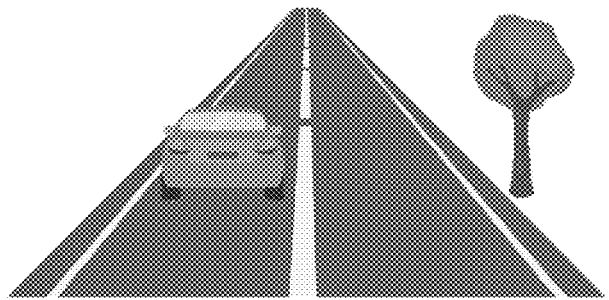
Figure 4C:
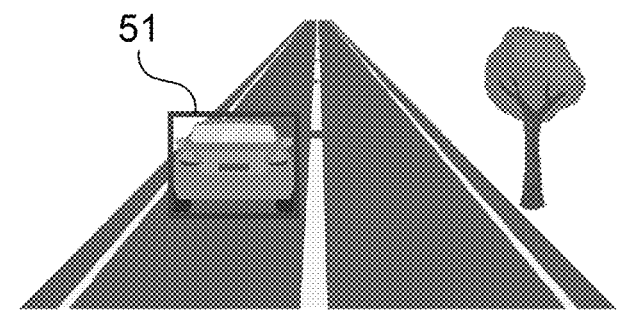

FIGS. 4A, 4B, and 4C are diagrams illustrating a method of correcting a driving image according to an exemplary embodiment of the present invention. FIG. 4A is a diagram illustrating a driving image before correction by the correcting unit 14. When the moving object tilts in the right direction during driving, a driving image as shown in FIG. 4A may be acquired by the image acquiring unit 11 according to a rotation of the image capturing apparatus in a right roll direction.

FIG. 4B is a driving image after correction by the correcting unit 14. The correcting unit 14 may correct the driving image as shown in FIG. 4B by rotating the driving image of FIG. 4A based on the tilt information acquired from the tilt information acquiring unit 12. Specifically, the correcting unit 14 may acquire tilt information according to rotation of the image capturing apparatus in a right roll direction, calculate a correction value to offset the acquired tilt information, and rotate the driving image using the calculated correction value to correct the driving image as shown in FIG. 4B.

Meanwhile, FIGS. 4A and 4B may show states before the target object is recognized by the target object recognizing unit 13.

Thereafter, as shown in FIG. 4C, the target object recognizing unit 13 may recognize the target object from the corrected driving image, and as the target object included in the corrected driving image is recognized, a bounding box 51 corresponding to the recognized target object may be displayed.

Meanwhile, as another example, the correcting unit 14 may correct the driving image by rotating a bounding box of the recognized target object in the driving image based on tilt information. This will be described in more detail with reference to FIGS. 5A and 5B.

Figure 5A:
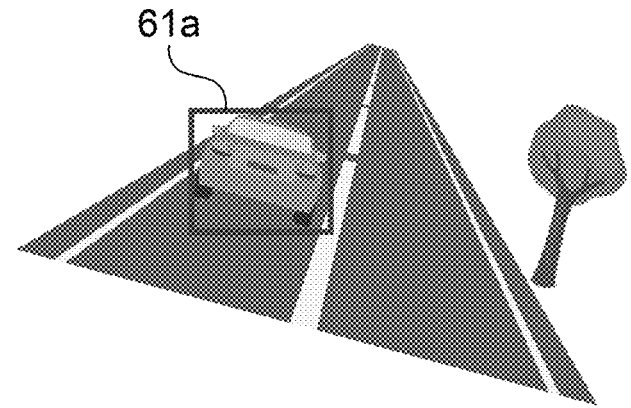
FIGS. 5A and 5B are diagrams illustrating a method of correcting a driving image according to another exemplary embodiment of the present invention.
Figure 5B:
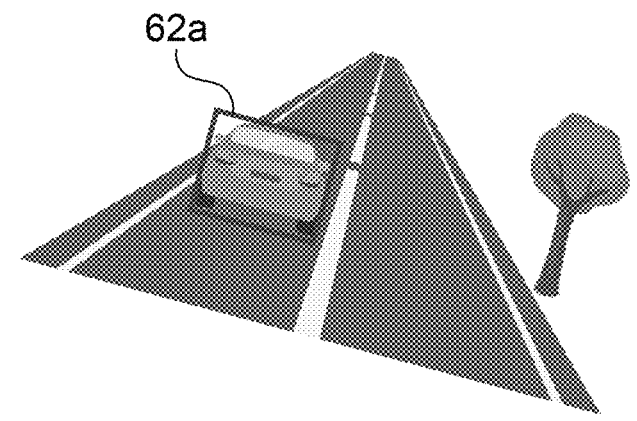

FIGS. 5A and 5B are diagrams illustrating a method of correcting a driving image according to another exemplary embodiment of the present invention.

FIG. 5A is a diagram illustrating a driving image before correction by the correcting unit 14 and that a target object is recognized in the driving image before correction. Referring to FIG. 5A, when the moving object tilts in the right direction while driving, the driving image before correction as shown in FIG. 5A may be acquired by the image acquiring unit 11 according to a rotation of the image capturing apparatus in a right roll direction. Also, the target object recognizing unit 13 may recognize a target object from the driving image before correction acquired by the image acquiring unit 11. In this case, according to the recognition of the target object included in the driving image before correction, a bounding box 61a corresponding to the recognized target object may be displayed.

FIG. 5B is a driving image after correction by the correcting unit 14, and the correcting unit 14 may rotate the bounding box 61a of the target object included in the driving image before correction of FIG. 5A based on the tilt information acquired by the tilt information acquiring unit 12 to correct the driving image to a driving image in which the bounding box 61b is rotated as shown in FIG. 5B. Specifically, the correcting unit 14 may acquire tilt information according to rotation of the image capturing apparatus in the right roll direction, calculate a correction value to offset the acquired tilt information, and rotate the bounding box 61a of the target object included in the driving image before correction using the calculated correction value to correct the image to a driving image in which a bounding box 61b is rotated as shown in FIG. 5B.

That is, the correcting unit 14 may correct the driving image using at least one of a first correction method of rotating the driving image itself based on the tilt information and a second correction method of rotating the bounding box of the target object in the driving image.

Here, the correcting unit 14 may determine a correction method to at least one of the first correction method and second correction method described above according to resource of the distance measurement apparatus 10 or processor performance or tilt information.

The correcting unit 14 according to the present invention described above may correct the driving image by calculating a correction value so that the tilt information of the image capturing apparatus capturing the driving image is offset, thereby minimizing a distance measurement error based on the driving image captured by the tilted image capturing apparatus.

Returning back to FIG. 1, the distance calculating unit 15 may calculate a distance between the moving object and the target object based on the corrected driving image.

Specifically, the distance calculating unit 15 may calculate the distance between the target object and the moving object using at least one of a first calculation method using size information of the target object and a second calculation method using position information of the target object. This will be described in more detail with reference to FIGS. 6A and 6B.

Figure 6A:
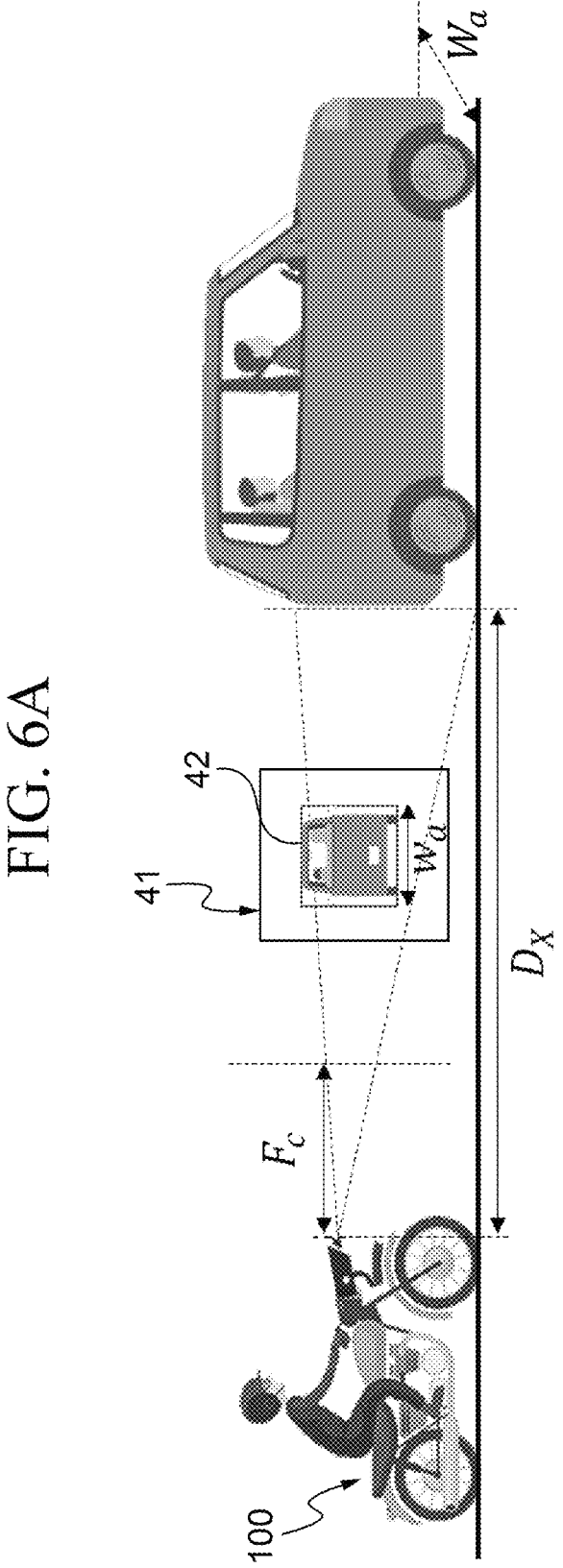
FIGS. 6A and 6B are diagrams illustrating a distance calculation method according to an exemplary embodiment of the present invention.
Figure 6B:
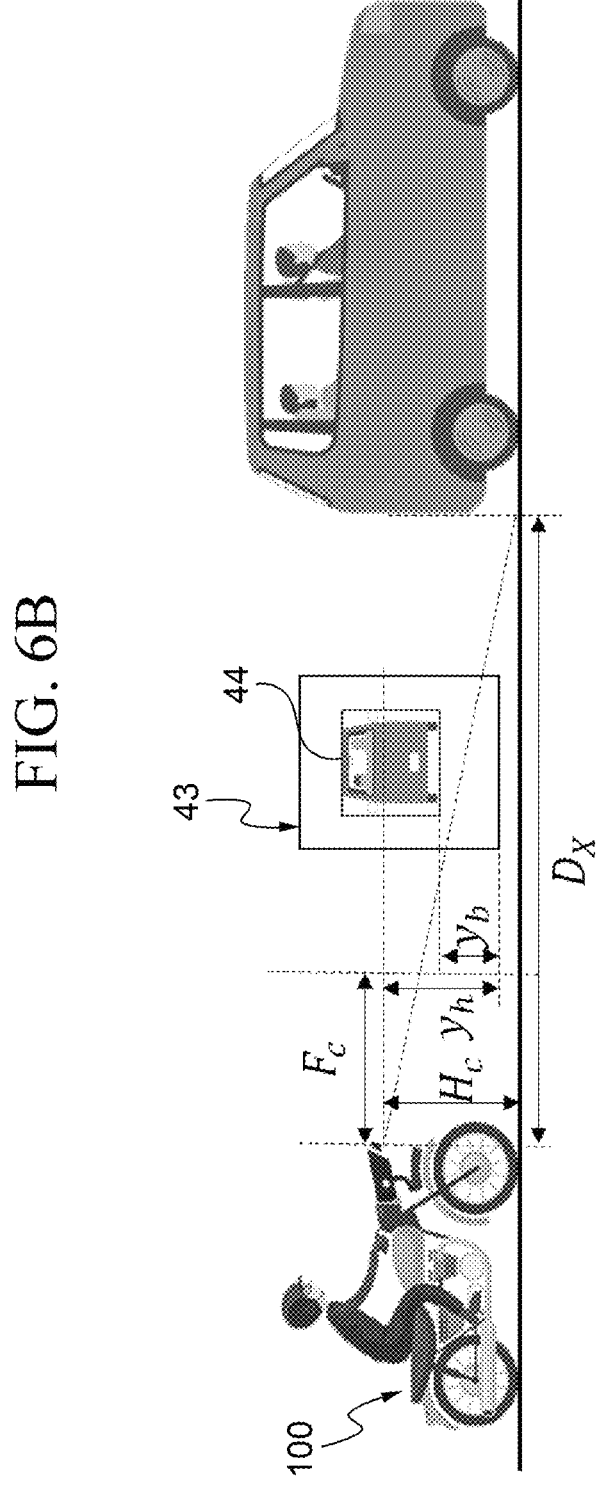

FIGS. 6A and 6B are diagrams illustrating a distance calculation method according to an exemplary embodiment of the present invention.

In relation to the first calculation method using the size information of the target object, the distance calculating unit 15 may calculate the distance between the moving object and the target object based on a width of the bounding box of the target object and an actual width of the target object, which are values related to the size of the target object. More specifically, the distance calculating unit 15 may calculate the distance between the target object and the moving object 100 using Equation 1 below.

$$D_x = F_c \cdot \frac{w_a}{W_a} \qquad \text{[Equation 1]}$$

In Equation 1, $D_x$ may refer to the distance between the target object and the moving object 100, $F_c$ may refer to a focal length of the image capturing apparatus, $w_a$ may refer to the width of the bounding box of the target object, and $W_a$ may refer to the actual width of the target object. Referring to FIG. 6(*a*), the distance calculating unit 15 may calculate the distance $D_x$ between the moving object 100 and the target object using the focal length $F_c$ of the image capturing apparatus mounted on the moving object 100, the width $w_a$ of the bounding box 42 of the recognized target object in the driving image 41, and the actual width $W_a$ of the recognized target object.

For example, the actual width $W_a$ of the target object may be calculated by detecting the actual width corresponding to the recognized target object type from the actual width of types (e.g., a two-wheeled vehicle, a compact vehicle, a medium vehicle, a large vehicle, etc.) of pre-stored target objects.

Regarding the second calculation method using the position information of the target object, the distance calculating unit 15 may calculate the distance between the moving object and the target object based on a height of a horizontal line in the driving image and a height of a bottom surface of the bounding box, which are values related to the position of the target object. More specifically, the distance calculating unit 15 may calculate the distance between the target object and the moving object 100 based on the vertical coordinates of the bottom surface of the bounding box and the horizontal line in the driving image. Specifically, the distance calculating unit 15 may calculate the distance between the target object and the moving object 100 using Equation 2 below.

$$D_x = \frac{F_c \cdot H_c}{y_b - \overline{y_h}} \qquad \text{[Equation 2]}$$

In Equation 2, $D_x$ is the distance between the target object and the moving object 100, $F_c$ is a focal length of the image capturing apparatus, $H_c$ is an actually installed height of the image capturing apparatus that has captured the driving image, $y_h$ is the height of the horizontal line in the driving image, and $y_b$ is the height of the bottom surface of the recognized bounding box. Here, $y_h$ and $y_b$ may refer to pixel vertical coordinates.

Referring to FIG. 6(*b*), the distance calculating unit 15 may calculate the distance $D_x$ between the moving object 100 and the target object using the focal length $F_c$ of the image capturing apparatus mounted on the moving object 100, the height $y_b$ of the bottom surface of the bounding box 44 of the recognized target object in the driving image 43, and the height $y_h$ of the horizontal line in the driving image 43.

If it is impossible to determine the horizontal line in the driving image 43, the distance calculating unit 15 may calculate the distance $D_x$ between the moving object 100 and the 10 target object using a height $\overline{y_h}$ of a virtual horizontal line, instead of the height $y_h$ of the horizontal line in the driving image.

Specifically, the distance calculating unit 15 may calculate the height $\overline{y_h}$ of the virtual horizontal line using Equation 3 below and calculate the distance $D_x$ between the moving object 100 and the target object by applying the calculated height $\overline{y_h}$ of the virtual horizontal line, instead of the height $y_h$ of the horizontal line in the driving image 43.

$$\overline{y_h} = \frac{1}{N} \cdot \sum_{i=1}^{N} \left( y_{b,i} - H_c \cdot \frac{W_i}{\overline{W} + \Delta W_i} \right) \cong \overline{y_b} - H_c \cdot \frac{\overline{w}}{\overline{W}} \qquad \text{[Equation 3]}$$

In Equation 3, $\overline{y_h}$ refers to a pixel vertical coordinate of the virtual horizonal line, N refers to the number of bounding boxes of the recognized target object in the driving image, $y_{b,i}$ refers to a pixel vertical coordinate of a bottom surface of an i-th recognized bounding box, $H_c$ refers to an actually installed height of the image capturing apparatus that has captured the driving image, $W_i$ refers to a pixel width of a bounding box of an i-th recognized target object, $\overline{W}$ refers to an actual average width of the target object, $\Delta W_i$ refers to an actual average width offset of the target object, $\overline{y_b}$ refers to an average pixel vertical coordinate of the bottom surfaces of the bounding boxes of the entire target objects, and $\overline{w}$ refers to the average width of the recognized target object. Here, the average width of the recognized target objects refers to 15 an average width of the bounding boxes of the target objects.

That is, the distance calculating unit 15 may calculate the distance between the moving object and the target object using at least one of size information and position information of the bounding box of the target object recognized from the driving image.

That is, the distance calculating unit 15 may calculate the distance between the moving object and the target object using at least one of size information and position information of the bounding box of the target object recognized from the driving image.

Meanwhile, distance measurement accuracy will be described by comparing before and after correction with reference to FIGS. 4 to 6 described above. Referring to FIGS. 4 and 5, the size of a bounding box 61a of a target object recognized in a driving image before correction may be larger than the size of a bounding box 62a of the target object recognized in the driving image after correction. In this manner, since the size of the bounding box 61a is not accurately recognized, when the distance is calculated based on Equations 1 to 3 based on the driving image before correction, a distance value is greater than the actual distance between the moving object and the target object may be calculated.

However, according to the present invention, the driving image is corrected by calculating a correction value so that the tilt information of the image capturing apparatus is offset and the distance is calculated based on Equations 1 to 3 using the corrected driving image, and thus, the distance measurement error problem may be solved.

Meanwhile, the distance measurement apparatus 10 described above may be implemented using software, hardware, or a combination thereof. For example, according to hardware implementation, the distance measurement apparatus 10 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and other electrical units for performing functions.

Meanwhile, the distance between the moving object and the target object calculated by the distance calculating unit 15 may be used to generate various guidance data based on the distance.

Specifically, according to an exemplary embodiment of the present invention, an electronic device that provides various driving-related guidance based on the distance calculated by the distance measurement apparatus 10 may be proposed.

Here, the electronic device may be implemented as various devices, such as smartphones, tablet computers, notebook computers, personal digital assistants (PDAs), portable multimedia players (PMPs), smart glasses, project glasses, navigations, car dash cams or car video recorders, which are image capturing apparatus for a vehicle, and may be provided in a vehicle.

Such an electronic device may include various guidance for assisting the driving of the vehicle driver, such as object departure guidance, object collision avoidance guidance, and object distance guidance based on the distance calculated by the distance measurement apparatus 10.

Here, the object departure guidance may be guidance on whether an object located close to a moving object in a stop state is departing.

In addition, the object collision avoidance guidance may be provided to prevent a collision with an object when a distance to an object located close to the moving object which is stopped or driving is within a predetermined distance.

In addition, the object distance guidance may guide the distance between the moving object and the target object.

Hereinafter, a method for calculating a distance according to an exemplary embodiment of the present invention will be described in detail with reference to the accompanying drawings.

FIG. 7 is a flowchart illustrating a method for measuring a distance according to an exemplary embodiment of the present invention. Referring to FIG. 7, the distance measurement apparatus 10 may acquire a driving image of a moving object (S100). Here, the driving image may be a driving image captured by the image capturing apparatus of the moving body itself or a separate image capturing apparatus, and the image capturing apparatus may include a first image capturing apparatus capturing a driving image in front thereof in movement and at least one second image capturing apparatus capturing a driving image in addition of the front.

Next, the distance measurement apparatus 10 may acquire tilt information according to the driving of the moving object 100 (S200). Here, the tilt information may be calculated based on a rotation value of a 3-axis sensor in the roll direction provided in the image capturing apparatus capturing a moving image of the moving object.

In addition, the distance measurement apparatus 10 may correct the driving image by using the tilt information to calculate the distance between the target object included in the driving image and the moving object (S300). Specifically, the distance measurement apparatus 10 may correct the driving image using at least one of a first correction method of rotating the driving image itself based on the tilt information and a second correction method of rotating a bounding box of a target object in the driving image. This will be described in more detail with reference to FIGS. 8 and 9.

FIG. 8 is a flowchart illustrating a driving image correction method according to an exemplary embodiment of the present invention. Referring to FIG. 8, the distance measurement apparatus 10 may rotate the driving image based on the tilt information (S310). Specifically, the distance measurement apparatus 10 may calculate a correction value to offset the tilt information and rotate the driving image using the calculated correction value.

Next, the distance measurement apparatus 10 may recognize a target object in the rotated driving image using a neural network model (S320). Specifically, the distance measurement apparatus 10 may recognize a target object by inputting the driving image in units of frames to the neural network model and generate a bounding box corresponding to the target object.

Figure 9:
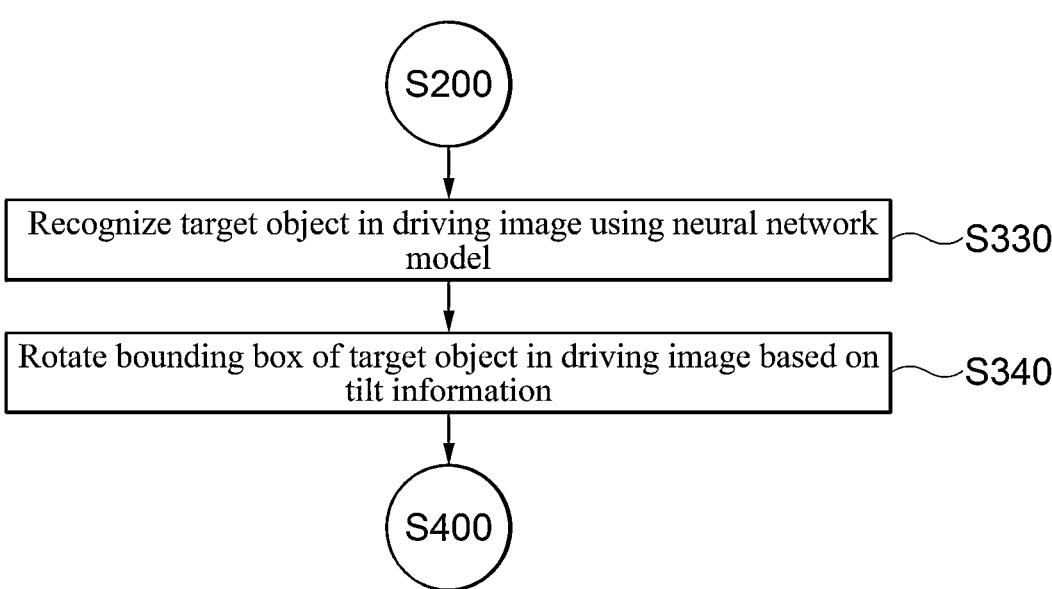

FIG. 9 is a flowchart illustrating a driving image correction method according to another exemplary embodiment of the present invention. Referring to FIG. 9, the distance measurement apparatus 10 may recognize a target object in a driving image using a neural network model (S330). Specifically, the distance measurement apparatus 10 may input the driving image in units of frames to the neural network model, recognize a target object, and generate a bounding box corresponding to the target object.

Next, the distance measurement apparatus 10 may rotate the bounding box of the target object recognized in the driving image based on the tilt information (S340).

Specifically, the distance measurement apparatus 10 may calculate a correction value to offset the tilt information and rotate the bounding box of the target object recognized in the driving image using the calculated correction value.

Referring back to FIG. 7, the distance measurement apparatus 10 may calculate the distance between the moving object and the target object based on the corrected driving image (S400).

Specifically, the distance measurement apparatus 10 may calculate the distance between the moving object and the target object by using at least one of the first calculation method using size information of the target object in the corrected driving image and the second calculation method using position information of the target object. For example, the distance measurement apparatus 10 may calculate the distance between the moving object and the target object based on Equations 1 to 3 described above.

In this case, the calculating of the distance may use at least one of the size information and position information of the bounding box of the target object recognized from the driving image.

Meanwhile, the distance measurement apparatus 10 may be implemented as a module of various devices and measure a distance between a moving object and a target object. This will be described in more detail with reference to FIGS. 10 to 14.

Figure 10:
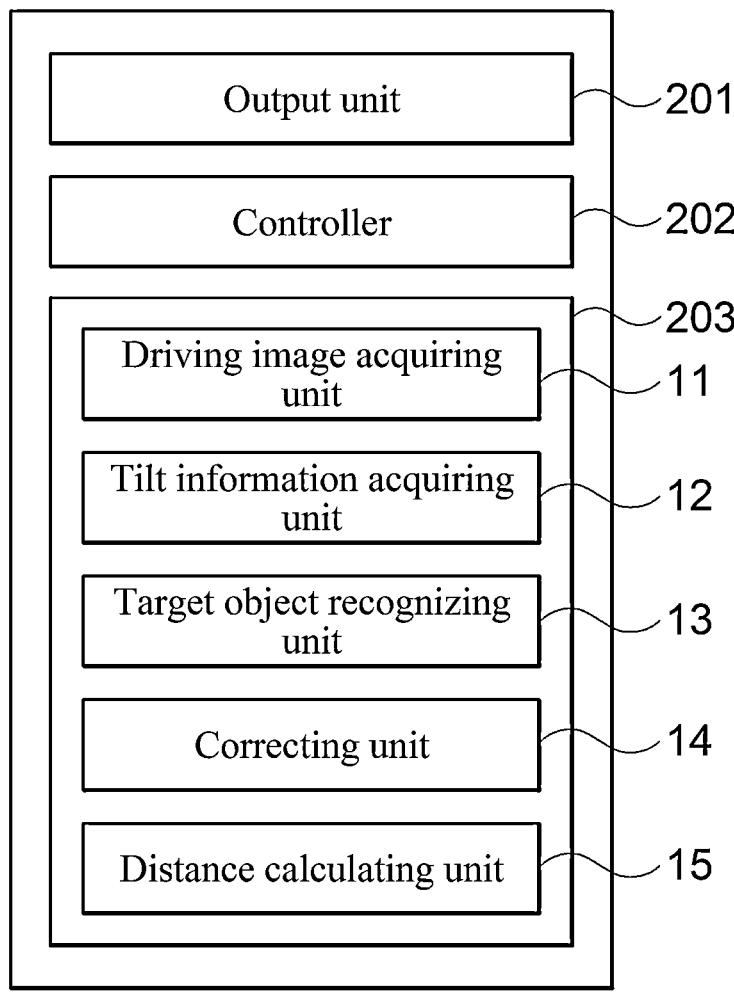
FIG. 10 is a block diagram illustrating a wearable helmet according to an exemplary embodiment of the present invention.
Figure 11:
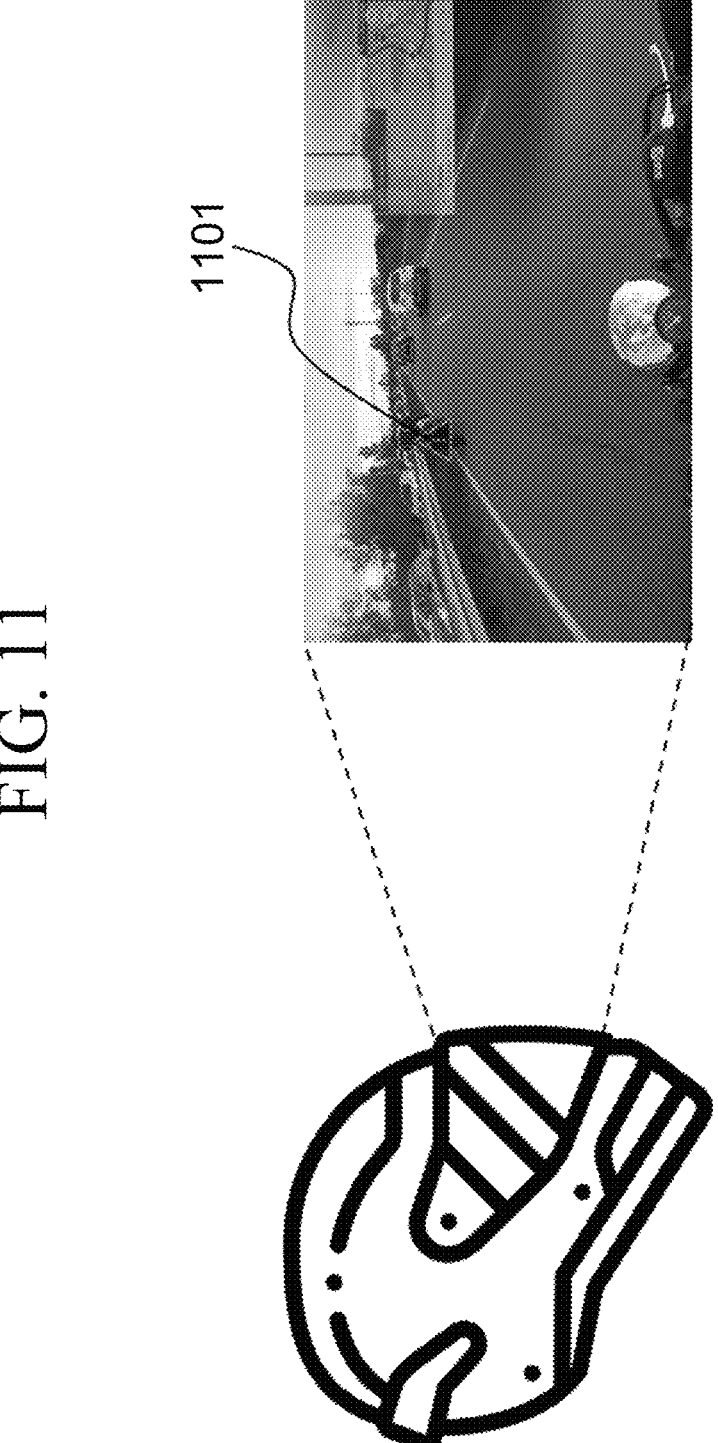
FIG. 11 is a view illustrating an implementation example of a wearable helmet according to an exemplary embodiment of the present invention.

FIG. 10 is a block diagram illustrating a configuration of a wearable helmet according to an exemplary embodiment of the present invention. FIG. 11 is a view illustrating an implementation example of a wearable helmet according to an exemplary embodiment of the present invention.

Referring to FIGS. 10 and 11, a wearable helmet 200 may include all or some of an output unit 201, a controller 202, and a distance measuring unit 203.

The distance measuring unit 203 may operate in the same manner as the distance measurement apparatus 10 described above and may calculate a distance between a moving object and a target object. In particular, the driving image acquiring unit 11 may be implemented to acquire a driving image captured by an image capturing apparatus (not shown) installed in the wearable helmet 200 as an example.

The output unit 201 may output various guidance data that may be visually checked by a wearer of the wearable helmet 200. For example, the output unit may be implemented as a head up display (HUD) outputting various guidance data toward goggles of the wearable helmet 200.

The controller 202 may control the operation of the wearable helmet 200, and in particular, the controller 202 generate various guidance data to be output to the output unit 201 based on the distance between the moving object and the target object calculated through the distance measuring unit 203. For example, the controller 202 may generate object departure guidance data, object collision avoidance guidance data, and object distance guidance data based on the calculated distance.

FIG. 11 shows an example of displaying various guidance data in a field of view of the wearer of the helmet 200 through the HUD according to an exemplary embodiment of the present invention. The controller 202 may generate the object collision avoidance guidance data based on the calculated distance data through the distance measuring unit 203, and the output unit 201 may display an object collision avoidance guidance object 1101 through the HUD.

Figure 12:
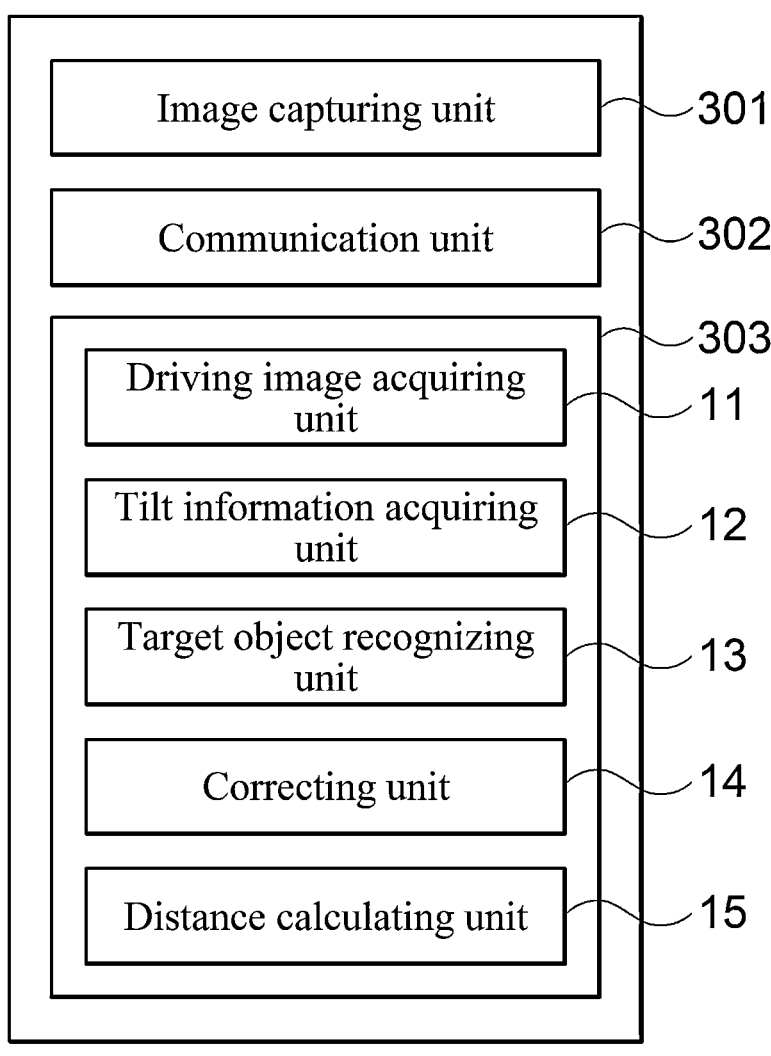
FIG. 12 is a block diagram illustrating an image capturing apparatus installed in a moving object according to an exemplary embodiment of the present invention.

FIG. 12 is a block diagram illustrating an image capturing apparatus installed in a moving object according to an exemplary embodiment of the present invention. Referring to FIG. 12, an image capturing apparatus 300 may include all or some of an image capturing unit 301, a communication unit 302, and a distance measuring unit 303.

The image capturing unit 301 may capture a driving image according to driving of a moving object. Here, the image capturing unit 301 may include a first image capturing unit installed in front of the moving object and captures a front driving image. In addition, the image capturing unit 301 may further include a second image capturing unit installed in a region other than the front and captures a driving image of the region other than the front.

The distance measuring unit 303 may operate in the same manner as the distance measurement apparatus 10 described above, and may calculate a distance between the moving object and the target object. In particular, the driving image acquiring unit 11 may be implemented to acquire a driving image captured by the image capturing unit 301 installed in the moving object. The communication unit 302 may perform a communication function for the image capturing apparatus 300. In particular, the communication unit 302 may transmit distance data between the moving object and the target object calculated by the distance measuring unit 303 to the wearable helmet 200 worn on the driver who drives the moving object.

Figure 13:
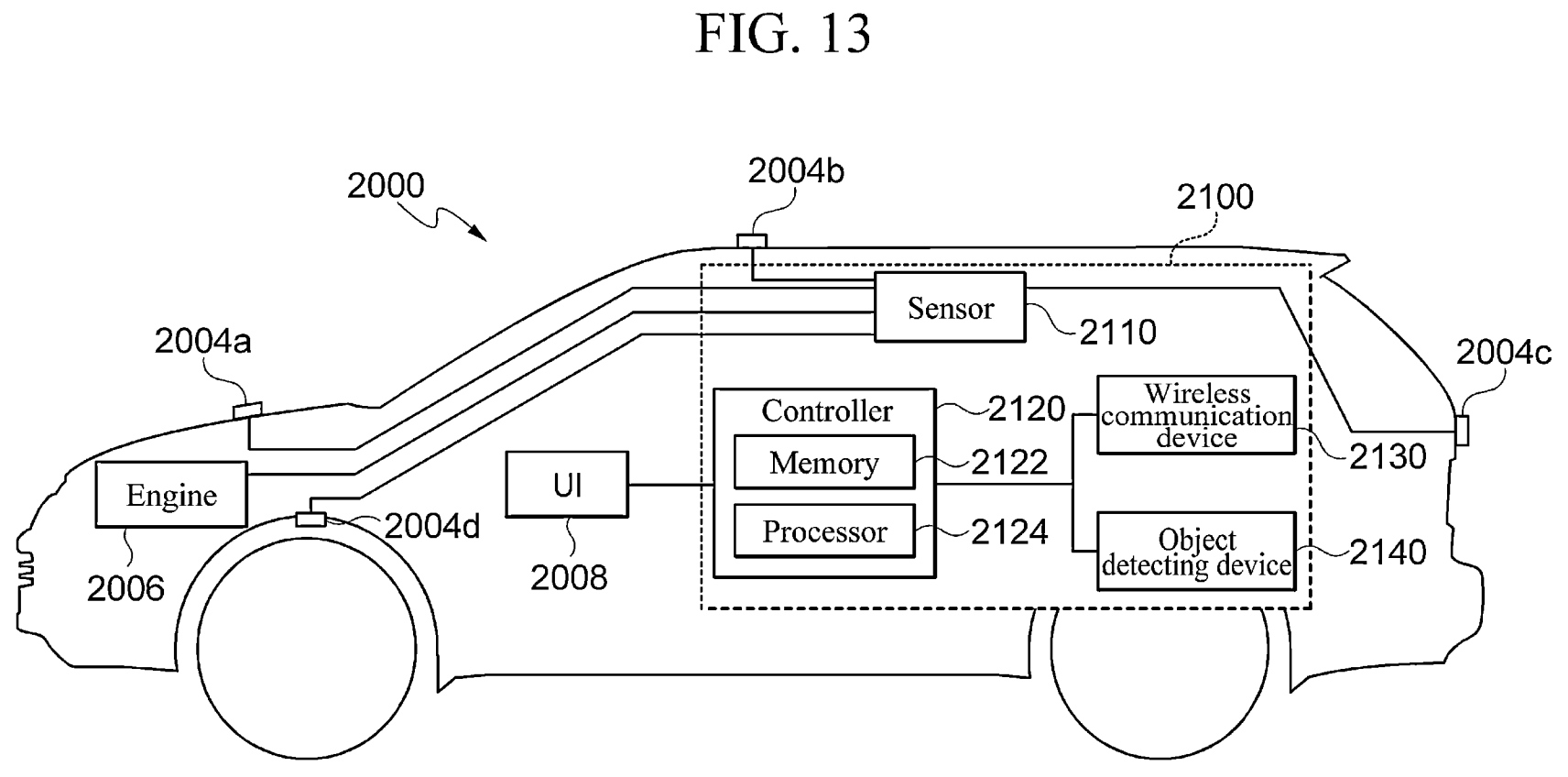
Figure 14:
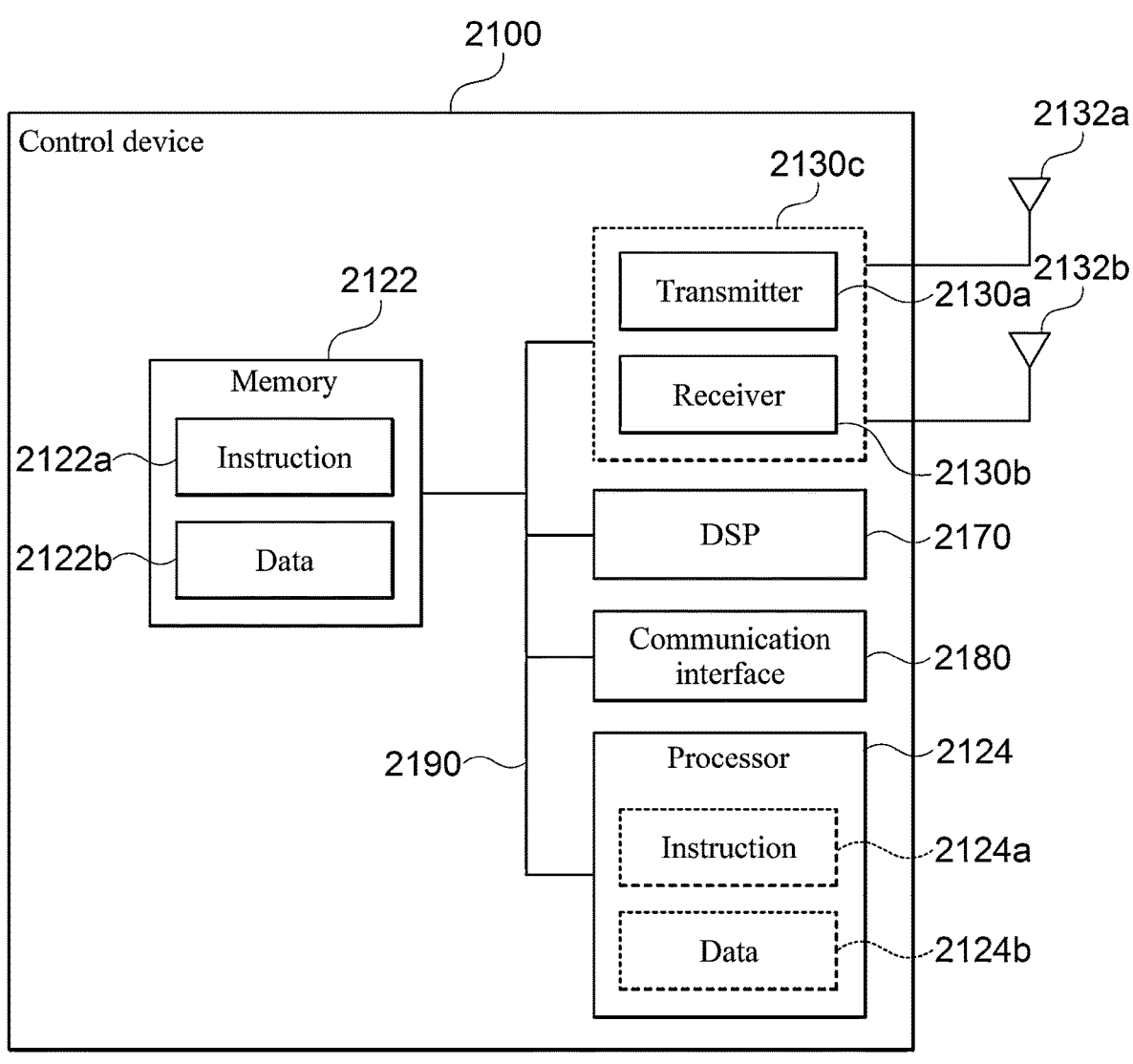

FIGS. 13 to 14 are block diagrams illustrating an autonomous moving object according to an exemplary embodiment of the present invention. Referring to FIG. 13, an autonomous moving object 2000 according to the present exemplary embodiment may include a control device 2100, sensing modules 2004a, 2004b, 2004c, and 2004d, an engine 2006, and a user interface 2008.

The autonomous moving object 2000 may have an autonomous driving mode or a manual mode. For example, the manual mode may be switched to the autonomous driving mode or the autonomous driving mode may be switched to the manual mode according to a user input received through the user interface 2008.

When the moving object 2000 is operated in the autonomous driving mode, the autonomous moving object 2000 may be operated under the control of the control device 2100.

In the present exemplary embodiment, the control device 2100 may include a controller 2120 including a memory 2122 and a processor 2124, a sensor 2110, a wireless communication device 2130, and an object detection device 2140.

Here, the object detection device 2140 may perform all or some of the functions of the distance measurement apparatus 10 described above.

That is, in the present exemplary embodiment, the object detection device 2140 may be a device for detecting an object located outside the moving object 2000, and the object detection device 2140 may detect an object located outside the moving object 2000 and generate object information according to a detection result.

The object information may include information on the presence or absence of an object, position information of an object, distance information between the moving object and the object, and relative speed information between the moving object and the object.

The object may include various objects located outside the moving object 2000, such as a lane, another vehicle, a pedestrian, a traffic signal, light, a road, a structure, a speed bump, a terrain object, and an animal. Here, the traffic signal may be a concept including a traffic light, a traffic sign, and a pattern or text drawn on a road surface. And, the light may be light generated from a lamp provided in another vehicle, light generated from a street lamp, or sunlight.

In addition, the structure may be an object located near the road and fixed to the ground. For example, the structure may include a streetlight, roadside tree, a building, a telephone pole, a traffic light, and a bridge. The terrain object may include a mountain, a hill, and the like.

The object detection device 2140 may include a camera module. The controller 2120 may extract object information from an external image captured by the camera module and process the information.

Also, the object detection device 2140 may further include image capturing apparatuses for recognizing an external environment. In addition to LIDAR, RADAR, GPS device, odometry, and other computer vision devices, ultrasonic sensors and infrared sensors may be used, and these devices may be selectively or simultaneously operated as needed to enable more precise detection.

Meanwhile, the distance measurement apparatus 10 according to an exemplary embodiment of the present invention may calculate a distance between the autonomous moving object 2000 and the object, and control the operation of the moving object based on the distance calculated in association with the control device 2100 of the autonomous moving object 2000.

For example, if there is a possibility of a collision depending on the distance between the autonomous moving object 2000 and the object, the autonomous moving object 2000 may control a brake to slow down or stop. As another example, if the object is a moving object, the autonomous moving object 2000 may control a driving speed of the autonomous moving object 2000 to maintain a predetermined distance or more from the object.

In addition, the distance measurement apparatus 10, in association with the control device 2100, may control the autonomous moving object 2000 to acquire tilt information as the autonomous moving object 2000 travels uphill, downhill, and on curves, correct at least one of a form, shape, and tilt of a bounding box of a target object recognized in the driving image based on the tilt information, and display the same.

In addition, the distance measurement apparatus 10 corrects an image input through a camera based on the tilt information of the autonomous moving object 2000 in association with the control device 2100. In addition, the distance measurement apparatus 10 may perform lane detection and obstacle detection for autonomous driving using the image corrected based on the tilt information of the autonomous moving object 2000, and control the autonomous moving object 2000 to perform autonomous driving based on a detection result.

The distance measurement apparatus 10 according to an exemplary embodiment of the present invention may be configured as a module within the control device 2100 of the autonomous moving object 2000. That is, the memory 2122 and the processor 2124 of the control device 2100 may implement a collision avoidance method according to the present invention in software.

In addition, the sensor 2110 may be connected to sensing modules 2004a, 2004b, 2004c, and 2004d to acquire various types of sensing information on an internal/external environment of the moving object. Here, the sensor 2110 may include a posture sensor (e.g., a yaw sensor or a roll sensor), a pitch sensor, a collision sensor, a wheel sensor, a speed sensor, an inclination sensor, a weight detection sensor, a heading sensor, a gyro sensor, a position module, a moving object forward/backward sensor, a battery sensor, a fuel sensor, a tire sensor, a steering sensor by steering wheel rotation, an internal moving object temperature sensor, an internal moving object humidity sensor, an ultrasonic sensor, an illuminance sensor, an accelerator pedal position sensor, a brake pedal position sensor, and the like.

Accordingly, the sensor 2110 may acquire moving object posture information, moving object collision information, moving object direction information, moving object position information (GPS information), moving object angle information, moving object speed information, moving object acceleration information, object tilt moving information, moving object forward/backward information, battery information, fuel information, tire information, moving object lamp information, moving object internal temperature information, moving object internal humidity information, and sensing signals for a steering wheel rotation angle, moving object external illuminance, pressure applied to an accelerator pedal, pressure applied to a brake pedal, etc.

In addition, the sensor 2110 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, a crank angle sensor (CAS), and the like.

As such, the sensor 2110 may generate moving object state information based on the sensing data.

The wireless communication device 2130 is configured to implement wireless communication between the autonomous moving objects 2000. For example, the autonomous moving object 2000 may communicate with a user's mobile phone, another wireless communication device 2130, another moving object, a central device (traffic control device), or a server. The wireless communication device 2130 may transmit and receive wireless signals according to an access wireless protocol. The wireless communication protocol may be Wi-Fi, Bluetooth, long-term Evolution (LTE), code division multiple access (CDMA), wideband code division multiple access (WCDMA), or global systems for mobile communications (GSM), but is not limited thereto.

In addition, in the present exemplary embodiment, the autonomous moving object 2000 may implement communication between moving objects through the wireless communication device 2130. That is, the wireless communication device 2130 may perform communication with other moving objects on the road through vehicle-to-vehicle (V2V) communication. The autonomous moving object 2000 may transmit and receive information, such as driving warning and traffic information, through vehicle-to-vehicle communication, and it is also possible to request or receive information from other moving objects. For example, the wireless communication device 2130 may perform V2V communication as a dedicated short-range communication (DSRC) device or a cellular-V2V (C-V2V) device. In addition to communication between vehicles, communication (vehicle-to-everything (V2X) communication) between a vehicle and other objects (e.g., an electronic device carried by a pedestrian) may also be implemented through the wireless communication device 2130.

In the present exemplary embodiment, the controller 2120 is a unit that controls an overall operation of each unit in the moving object 2000, and may be configured by the manufacturer of the moving object at the time of manufacturing or additionally configured to perform the function of autonomous driving after manufacturing. Alternatively, a configuration for continuously performing additional functions may be included through an upgrade of the controller 2120 configured at the time of manufacturing. Such a controller 2120 may be referred to as an electronic control unit (ECU).

The controller 2120 may collect various data from the connected sensor 2110, the object detection device 2140, the communication device 2130, etc., and transmit a control signal to the sensor 2110, the engine 2006, the user interface 2008, the communication device 2130, and the object detection device 2140 based on the collected data. In addition, although not shown, a control signal may also be transmitted to an accelerator, a braking system, a steering device, or a navigation device related to driving of a moving object.

In the present exemplary embodiment, the controller 2120 may control the engine 2006, and for example, the engine 2006 may detect a speed limit of a road on which the autonomous moving object 2000 is driving and control the engine 2006 so that a driving speed does not exceed the speed limit, or control the engine 2006 so that a driving speed of the autonomous moving object 2000 may be accelerated within a range not exceeding the speed limit.

In addition, if the autonomous moving object 2000 is approaching or departing from a lane while the autonomous moving object 2000 is driving, the controller 2120 may determine whether the approaching or departing from the lane is based on normal driving conditions or other driving conditions, and control the engine 2006 to control the driving of the moving object according to a determination result. Specifically, the autonomous moving object 2000 may detect lanes formed on both sides of a driving lane in which the moving object is driving. In this case, the controller 2120 may determine whether the autonomous moving object 2000 is approaching or departing from a lane, and if it is determined that the autonomous moving object 2000 is approaching or departing from a lane, the controller 2120 may determine whether the driving is based on an accurate driving situation or another driving condition. Here, an example of a normal driving situation may be a situation in which a vehicle needs to change the driving lane. Also, an example of another driving situation may be a situation in which a vehicle does not need to change the driving lane. If the controller 2120 determines that the autonomous moving object 2000 is approaching or departing from a lane in a situation where the vehicle does not need to change driving lanes, the controller 2120 may control the autonomous moving object 2000 to normally drive, without departing from a lane.

When another moving object or an obstacle exists in front of the moving object, the controller 2120 may control the engine 2006 or the braking system to decelerate the moving object on the move, and may also control a trace, a travel path, and steering angle in addition to a speed. Alternatively, the controller 2120 may control the driving of the moving object by generating necessary control signals according to recognition information of other external environments, such as driving lanes and driving signals of the moving object.

In addition to generating the control signal of its own, the controller 2120 may also control the driving of the moving object by communicating with a surrounding moving object or a central server and transmitting commands to control the peripheral devices through received information.

In addition, when the position of the camera module changes or an angle of view of the camera module changes, it may be difficult to accurately recognize the moving object according to the present exemplary embodiment or a lane, and thus, in order to prevent this, the controller 2120 may generate a control signal for controlling performing of calibration of the camera module. Therefore, in the present exemplary embodiment, since the controller 2120 generates a calibration control signal to the camera module, even though a mounting position of the camera module changes due to vibrations or shock occurring according to movement of the autonomous moving object 2000, the normal mounting position, direction, and angle of view of the camera module may be continuously maintained. When initial mounting position, direction, and angle of view information of the camera module stored in advance and the initial mounting position, direction, and angle of view information of the camera module measured while the autonomous moving object 2000 is driving are different by a threshold value or more, the controller 2120 may generate a control signal to perform calibration of the camera module.

In the present exemplary embodiment, the controller 2120 may include the memory 2122 and the processor 2124. The processor 2124 may execute software stored in the memory 2122 according to a control signal from the controller 2120. Specifically, the controller 2120 may store data and instructions for performing a lane detection method according to the present invention in the memory 2122, and the instructions may be executed by the processor 2124 to implement one or more methods disclosed herein.

In this case, the memory 2122 may be stored in a recording medium executable by the non-volatile processor 2124. The memory 2122 may store software and data via appropriate internal and external devices. The memory 2122 may include a random access memory (RAM), a read only memory (ROM), a hard disk, and the memory device 2122 connected to a dongle.

The memory 2122 may store at least an operating system (OS), user applications, and executable commands. The memory 2122 may also store application data and array data structures.

The processor 2124 may be a microprocessor or other suitable electronic processor, which may be a controller, microcontroller, or state machine.

The processor 2124 may be implemented as a combination of computing devices, and the computing device may include a digital signal processor, a microprocessor, or an appropriate combination thereof.

Meanwhile, the autonomous moving object 2000 may further include the user interface 2008 for a user's input for the control device 2100 described above. The user interface 2008 may allow the user to input information with appropriate interaction. For example, the user interface 2008 may be implemented as a touch screen, keypad, operation button, and the like. The user interface 2008 may transmit an input or command to the controller 2120, and the controller 2120 may perform a control operation of a moving object in response to the input or command.

In addition, the user interface 2008 may allow a device outside the autonomous moving object 2000 to communicate with the autonomous moving object 2000 through the wireless communication device 2130. For example, the user interface 2008 may interwork with a mobile phone, a tablet, or other computing devices.

Furthermore, although the autonomous moving object 2000 has been described as including the engine 2006 in the present exemplary embodiment, it is possible to include other types of propulsion systems. For example, the moving object may be operated by electric energy, hydrogen energy or through a hybrid system including a combination thereof. Therefore, the controller 2120 may include a propulsion mechanism according to the propulsion system of the autonomous moving object 2000, and may provide a control signal according to the propulsion mechanism to components of each propulsion mechanism.

Hereinafter, a detailed configuration of the control device 2100 according to the present exemplary embodiment will be described in more detail with reference to FIG. 14.

The control device 2100 includes a processor 2124. The processor 2124 may be a general-purpose single or multi-chip microprocessor, a dedicated microprocessor, a microcontroller, a programmable gate array, or the like. The processor may also be referred to as a central processing unit (CPU). Also, in the present exemplary embodiment, the processor 2124 may be used as a combination of a plurality of processors.

The control device 2100 also includes a memory 2122. The memory 2122 may be any electronic component capable of storing electronic information. The memory 2122 may also include a combination of memories 2122 in addition to a single memory.

Data and instructions 2122*a* for performing the distance measuring method of the distance measurement apparatus 10 according to the present invention may be stored in the memory 2122. When the processor 2124 executes the instructions 2122*a*, all or some of the instructions 2122*a* and data 2122*b* required to execute the instructions may be loaded (2124*a*, 2124*b*) onto the processor 2124.

The control device 2100 may include a transmitter 2130*a*, a receiver 2130*b*, or a transceiver 2130*c* to allow transmission and reception of signals. One or more antennas 2132*a* and 2132*b* may be electrically connected to the transmitter 2130*a*, the receiver 2130*b*, or each transceiver 2130*c* and may additionally include antennas.

The control device 2100 may include a digital signal processor (DSP) 2170. Through the DSP 2170, digital signals may be rapidly processed by moving objects.

The control device 2100 may also include a communication interface 2180. The communication interface 2180 may include one or more ports and/or communication modules for connecting other devices to the control device 2100. The communication interface 2180 may allow a user and the control device 2100 to interact with each other.

Various components of the control device 2100 may be connected together by one or more buses 2190, and the buses 2190 may include a power bus, a control signal bus, a status signal bus, a data bus, and the like. Under the control of the processor 2124, components may transfer information to each other through the bus 2190 and perform desired functions.

Meanwhile, to according various exemplary embodiments of the present invention described above, a distance between the moving object and the target object may be accurately measured using a driving image captured in a driving environment of the moving object in which a large rotation in a roll direction occurs.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the method for providing a driving related guidance service according to various exemplary embodiments of the present invention described above may be implemented as programs and be provided to servers or devices. Therefore, the respective apparatuses may access the servers or the devices in which the programs are stored to download the programs.

In addition, the method according to various exemplary embodiments of the present invention described above may be implemented as a program and stored in various non-transitory computer readable media and provided. The non-transitory computer readable medium is not a medium that stores data for a short time, such as a register, a cache, a memory, or the like, but means a machine readable medium that semi-permanently stores data. Specifically, various applications or programs described above may be stored and provided in the non-transitory computer readable medium, such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, and may be variously modified by those skilled in the art to which the present invention pertains without departing from the scope and spirit of the present invention as claimed in the claims. These modifications should also be understood to fall within the technical spirit and scope of the present invention.

What is claimed is:

1. A method for measuring a distance using a processor, the method comprising:

acquiring a driving image of surroundings of a moving object;

acquiring tilt information according to driving of the moving object;

correcting the driving image using the tilt information; and calculating a distance between the moving object and a target object included in the driving image based on the corrected driving image, wherein the calculating the distance comprises calculating the distance between the moving object and the target object based on a height of a horizontal line in the driving image and a height of a bottom surface of a bounding box corresponding to the target object, and wherein the method measures the distance between the moving object and the target object using the driving image captured in a driving environment of the moving object in which a rotation in a roll direction occurs.

2. The method of claim 1, wherein the tilt information is calculated based on a rotation value of a 3-axis sensor in a roll direction.

3. The method of claim 2, wherein the 3-axis sensor is provided in an image capturing apparatus for capturing the driving image of the moving object.

4. The method of claim 3, wherein the image capturing apparatus includes:

a first image capturing apparatus capturing an image of a front of the moving object; and at least one second image capturing apparatus capturing an image other than the front.

5. The method of claim 1, further comprising:

recognizing a target object in the driving image using a neural network model, wherein the neural network model is a model trained to recognize an object in the driving image and output a bounding box representing an object region in the driving image.

6. The method of claim 5, wherein the correcting includes rotating the driving image based on the tilt information, and the recognizing includes recognizing a target object based on the rotated driving image.

7. The method of claim 5, wherein the correcting includes rotating a bounding box of a target object recognized from the driving image based on the tilt information.

8. A non-transitory computer-readable recording medium in which a program for performing a method for measuring a distance according to claim 1 is stored.

9. An apparatus for measuring a distance, the apparatus comprising:

a driving image acquiring unit acquiring a driving image of surroundings of a moving object;

a processor acquiring tilt information according to driving of the moving object;

the processor correcting the driving image using the tilt information; and the processor calculating the distance between the moving object and a target object included in the driving image based on a corrected driving image, wherein the processor calculates the distance comprises calculating the distance between the moving object and the target object based on a height of a horizontal line in the driving image and a height of a bottom surface of a bounding box corresponding to the target object, and where in the apparatus is configured to measure the distance between the moving object and the target object using the driving image captured in a driving environment of the moving object in which a rotation in a roll direction occurs.

10. The apparatus of claim 9, wherein the tilt information is calculated based on a rotation value of a 3-axis sensor in a roll direction.

11. The apparatus of claim 10, wherein the 3-axis sensor is provided in an image capturing apparatus capturing a driving image of the moving object.

12. The apparatus of claim 11, wherein the image capturing apparatus includes:

a first image capturing apparatus capturing an image of a front of the moving object; and at least one second image capturing apparatus capturing an image other than the front.

13. The apparatus of claim 10, further comprising:

the processor recognizing a target object in the driving image using a neural network model, wherein the neural network model is a model trained to recognize an object in the driving image and output a bounding box representing an object region in the driving image.

14. The apparatus of claim 13, wherein the processor rotates the driving image based on the tilt information, and the processor recognizes the target object based on the rotated driving image.

15. The apparatus of claim 14, wherein the processor rotates the bounding box of the target object recognized in the driving image based on the tilt information.

16. A wearable helmet for a personal mobility device driver, the wearable helmet comprising:

a head up display (HUD) outputting guidance information that can be checked by a driver;

a driving image acquiring unit acquiring a driving image of surroundings of a moving object;

a processor acquiring tilt information according to driving of the moving object;

the processor correcting the driving image using the tilt information; and the processor calculating a distance between the moving object and a target object included in the driving image based on the corrected driving image, wherein the processor calculates the distance comprises calculating the distance between the moving object and the target object based on a height of a horizontal line in the driving image and a height of a bottom surface of a bounding box corresponding to the target object, and wherein the wearable helmet is configured to measure the distance between the moving object and the target object using the driving image captured in a driving environment of the moving object in which a rotation in a roll direction occurs.

17. The wearable helmet of claim 16, further comprising:

a controller controlling the HUD to display a calculated distance.

18. An image capturing apparatus installed in a personal mobility device, the image capturing apparatus comprising:

an image capturing unit capturing a driving image of surroundings of a moving object;

a processor acquiring tilt information according to driving of the moving object;

the processor correcting the driving image using the tilt information; and the processor calculating a distance between the moving object and a target object included in the driving image based on the corrected driving image, wherein the processor calculates the distance comprises calculating the distance between the moving object and the target object based on a height of a horizontal line in the driving image and a height of a bottom surface of a bounding box corresponding to the target object, and wherein the image capturing apparatus is configured to measure the distance between the moving object and the target object using the driving image captured in a driving environment of the moving object in which a rotation in a roll direction occurs.

19. The image capturing apparatus of claim 18, further comprising:

the processor transmitting data on the distance between the moving object and the target object to a wearable helmet for a driver of the personal mobility device.

\* \* \* \* \*